United States Patent
Los et al.

(10) Patent No.: US 6,819,126 B2
(45) Date of Patent: Nov. 16, 2004

(54) SIGNAL SAMPLING USING FLEX CIRCUITS ON DIRECT INTER-CONNECTS

(75) Inventors: Leslie Los, Lafayette, CO (US); Eric Grant Pavol, Louisville, CO (US); David M. Cravens, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 273 days.

(21) Appl. No.: 09/751,249

(22) Filed: Dec. 29, 2000

(65) Prior Publication Data

US 2002/0084908 A1 Jul. 4, 2002

(51) Int. Cl.[7] .......................... G01R 1/073; H01R 4/66
(52) U.S. Cl. .................. 324/754; 324/538; 439/225
(58) Field of Search .............................. 324/754, 755, 324/765, 538, 72.5, 122; 439/66, 68, 77, 225, 492

(56) References Cited

U.S. PATENT DOCUMENTS

| | | | | |
|---|---|---|---|---|
| 2,023,947 A | * | 12/1935 | Auble .......................... | 324/408 |
| 2,385,620 A | * | 9/1945 | Fleckenstein ............... | 340/687 |
| 3,234,464 A | * | 2/1966 | Cook .......................... | 324/122 |
| 3,701,964 A | * | 10/1972 | Cronin ......................... | 439/45 |
| 3,753,261 A | * | 8/1973 | Thaxton ...................... | 340/649 |
| 3,970,802 A | * | 7/1976 | Nijman ........................ | 379/325 |
| 4,435,740 A | * | 3/1984 | Huckabee et al. .......... | 361/749 |
| 4,676,564 A | * | 6/1987 | Mitchell, Jr. ................ | 439/77 |
| 4,921,439 A | * | 5/1990 | Bofill et al. ................ | 439/417 |
| 4,963,821 A | * | 10/1990 | Janko et al. ................ | 324/754 |
| 5,126,657 A | * | 6/1992 | Nelson ......................... | 439/68 |
| 5,548,223 A | * | 8/1996 | Cole et al. .................. | 324/754 |
| 5,859,538 A | * | 1/1999 | Self ............................. | 324/765 |
| 5,896,037 A | * | 4/1999 | Kudla et al. ................ | 324/755 |
| 6,124,716 A | * | 9/2000 | Kanamori .................... | 324/538 |

* cited by examiner

Primary Examiner—Ernest Karlsen
(74) Attorney, Agent, or Firm—Yee & Associates PC

(57) ABSTRACT

A method and system for sampling data signals between electronic components are provided. The invention comprises using a straight feed-through connector to connect electronic components and attaching one end of a flexible circuit to the pins of the feed-through connector. The other end of the flexible circuit is attached to a display, such as a LED. The display constitutes a field replaceable unit (FRU), which allows a malfunctioning display (i.e. LED) to be replaced without having to remove other electronic components. The present invention can be used for the detection of fault signals, status, idle signals, error checking, and introduction of a signal analyzer.

9 Claims, 5 Drawing Sheets

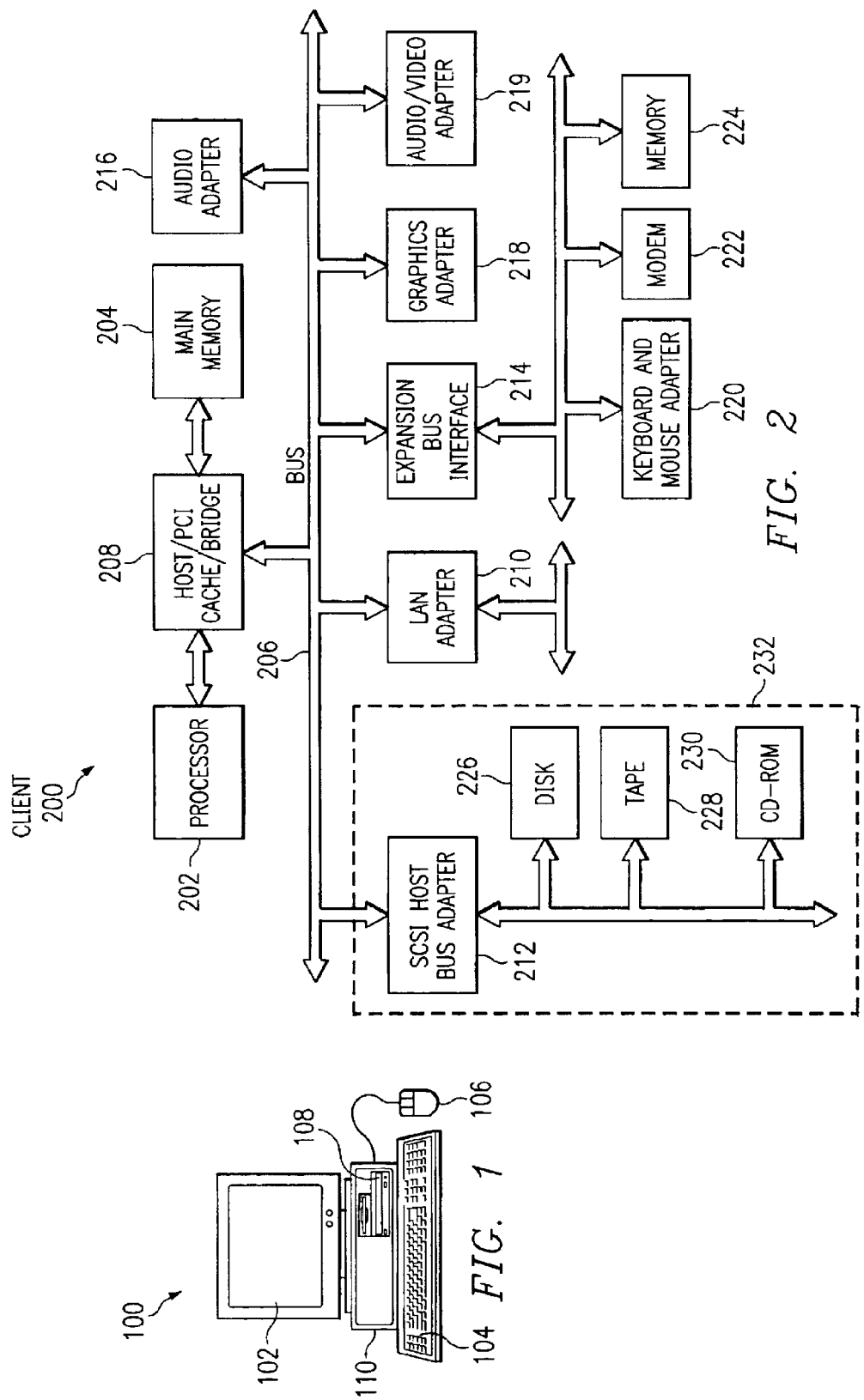

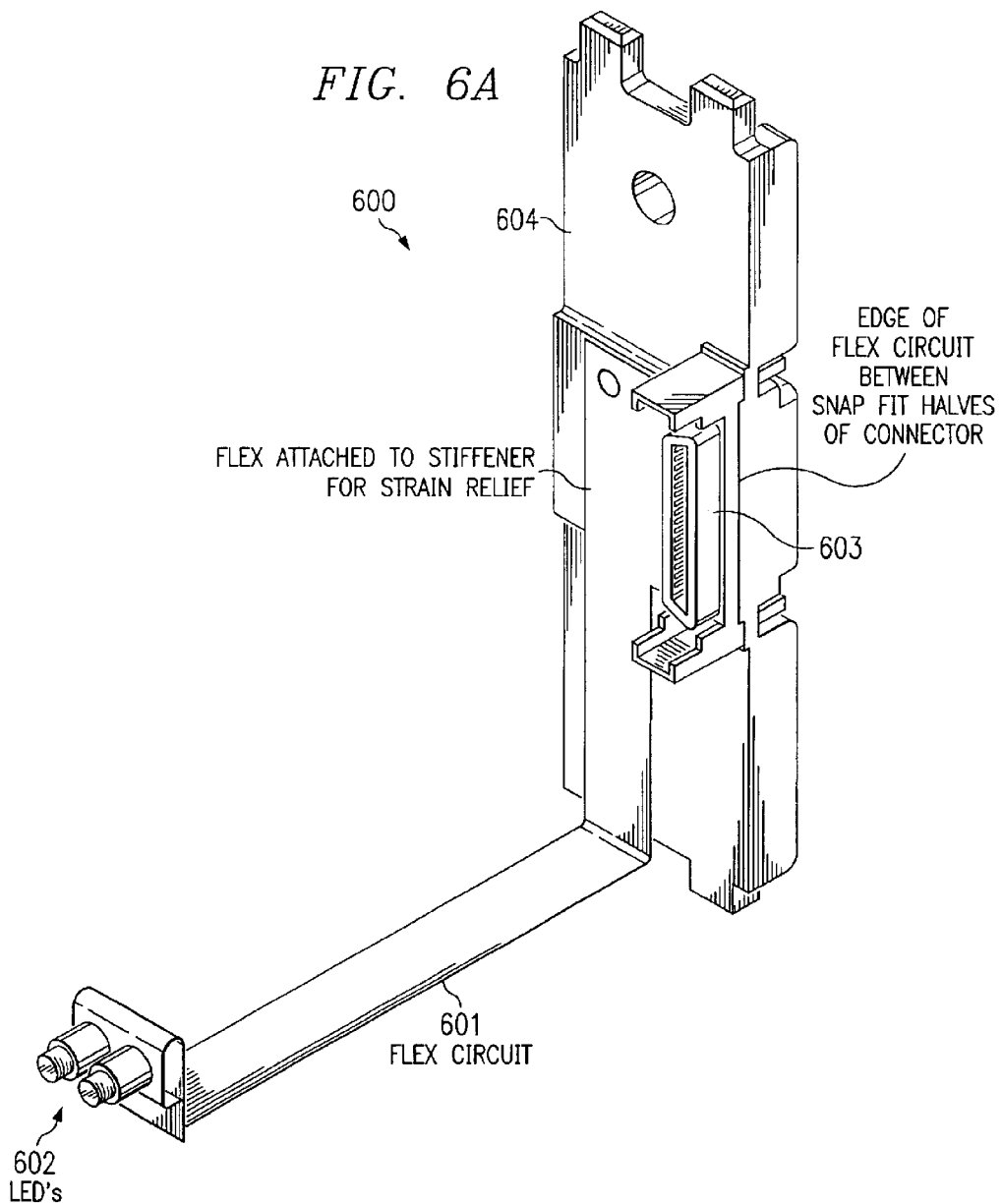

SIGNAL SAMPLING USING FLEX CIRCUITS ON DIRECT INTER-CONNECTS

BACKGROUND OF THE INVENTION

1. Technical Field:

The present invention relates to signal sampling between components in a computer system.

2. Description of Related Art:

Disk drive attachment to a motherboard, using the industry standard Single Connector Attachment (SCA), will not allow for signal sampling and/or redirection of signals to Light Emitting Diode (LED) indicators. Drive integration and the use of various drive vendors has presented an issue of access to LED indicator signals from drive option block connectors. Some vendors are eliminating the option block connectors from their designs.

Current practice is to use two connectors with a flex circuit to bridge between the drive and the motherboard, and use a third connector, on the flex circuit, to connect to the drive's option block. With high-speed signals, such as Fiber channel 2 gigabits/sec, the multiple connectors and flex circuits solution presents impedance and capacitance clumping issues. Each connection has a capacitance. If the connecting flex is short, the two capacitances can clump together and reflect the signal. Lengthening the flex will reduce capacitance clumping but will also increase resistance and signal loss in the flex. Higher cost and lower reliability are also result from the two-connector solution.

Another approach has been to place LEDs on the motherboard or backplane and use light pipes on the Field Replaceable Units (FRUs). The light pipes are used to convey activity and failure indicators from the LEDs. Unfortunately, this introduces reliability and servicing problems related to the backplane. To replace a defective LED, the backplane would have to be removed, resulting in the whole machine being taken down.

SUMMARY OF THE INVENTION

The present invention provides a method and system for sampling data signals between electronic components. The invention comprises using a straight feed-through connector to connect electronic components and attaching one end of a flexible circuit to the pins of the feed-through connector. The other end of the flexible circuit is attached to a display, such as a LED. The display constitutes a field replaceable unit (FRU), which allows a malfunctioning display (i.e. LED) to be replaced without having to remove other electronic components or interrupt machine availability. The present invention can be used for the detection of fault signals, status, idle signals, error checking, and introduction of a signal analyzer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a data processing system in which the present invention may be implemented in accordance with a preferred embodiment of the present invention;

FIG. 2 depicts a block diagram of a data processing system in which the present invention may be implemented;

FIG. 6A depicts a perspective view pictorial diagram illustrating the flex circuit carrying the signal tap in accordance with the present invention;

DETAILED DESCRIPTION OF THE PREFERRED EMBODIMENT

Figure 3A:
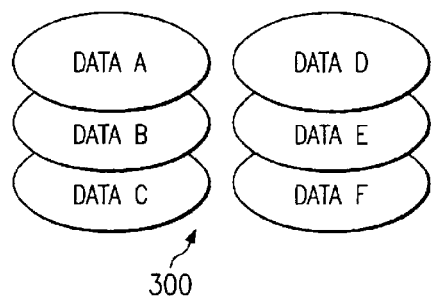
FIGS. 3A-3C depict schematic diagrams illustrating three examples of PAID systems in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer or Redundant Array of Independent Disks (RAID) system. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors. The present invention can be implemented at any one of these interconnections.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/ or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3B:
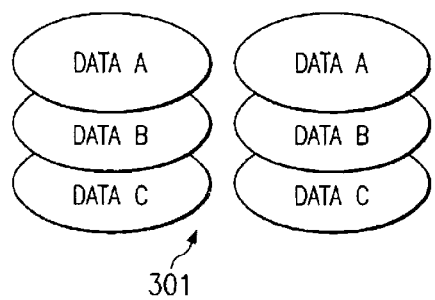
Figure 3C:
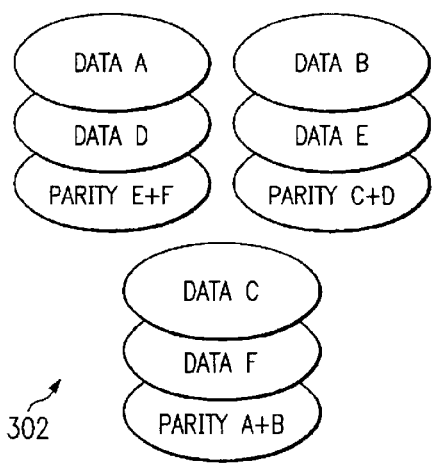

Turning to FIGS. 3A-3C, schematic diagrams illustrating three examples of RAID systems in which the present invention may be implemented are depicted in accordance with one embodiment of the present invention. RAID is a disk subsystem that increases performance and/or provides fault tolerance, and is comprised of a set of two or more hard disks and a specialized disk controller that contains the RAID functionality. Developed initially for servers and stand-alone disk storage systems, RAID is increasingly becoming available in desktop PCs, primarily for fault tolerance.

RAID improves performance by disk striping, which interleaves bytes or groups of bytes across multiple drives, so more than one disk is reading and writing simultaneously. Fault tolerance is achieved by mirroring or parity. Mirroring is 100% duplication of the data on two drives, and parity calculates the data in two drives and stores the result on a third drive. A failed drive can be hot swapped with a new one, and the RAID controller automatically rebuilds the lost data.

RAID 300 is an example of disk striping only, which interleaves data across multiple disks for better performance. However, this approach does not provide safeguards against failure. RAID 301 employs disk mirroring, which provides 100% duplication of data. This approach offers the highest reliability, but doubles storage costs. RAID 302 employs data striping across three or more drives for performance and parity bits for fault tolerance. The parity bits from two drives are stored on a third drive. This is the most widely used approach to RAID systems. The present invention can be used with any of the example RAID approaches described above, as well as other types of RAID configurations.

Figure 4:
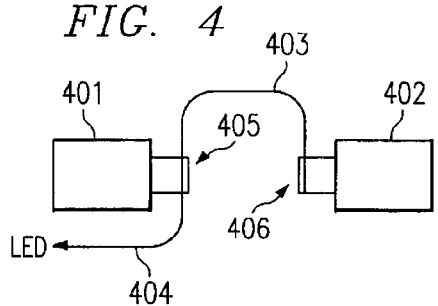
FIG. 4 depicts a schematic diagram illustrating the use of a flex circuit to connect components in accordance with the prior art.

Referring to FIG. 4, a schematic diagram illustrating the use of a flex circuit to connect components is depicted in accordance with the prior art. The prior art approach is to use a flex circuit 403 to connect components 401 and 402, with a separate branch 404 leading to the LED. There are two contact points 405 and 406, at each end of the flex 403. This prior art approach has the disadvantage of increased signal length and added resistance due to the flex, as well as the resistance created by multiple contact points 405 and 406.

Figure 5A:
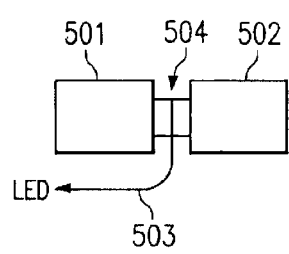
FIG. 5A depicts a schematic diagram illustrating signal sampling in accordance with the present invention.
Figure 5B:
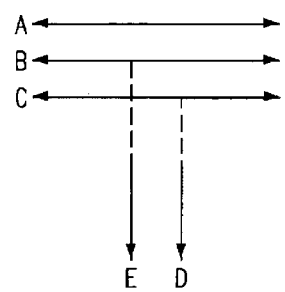
FIG. 5B depicts a diagram illustrating the T concept underlying the signal tap method of the present invention.

Referring to FIG. 5A, a schematic diagram illustrating signal sampling is depicted in accordance with the present invention. Two components 501 and 502 are connected with a straight feed-through connector 504. An example of such a feed-through connector is the Molex interposer connector. The feed-through connector and the introduction of a flex circuit 503 reduces the number of contact points. By eliminating flex 403, the signal length is reduced and the resistance created by flex 403 is eliminated. In addition, since the Molex connector is a straight feed-through connector, the electrical factors of impedance and capacitive clumping are considerably reduced. The signal sampling method in the present invention represents a "T" concept, which is illustrated in FIG. 5B. Signals a, b, and c represent the primary signals traveling between components 501 and 502. Signals d and e represents the tap, which is redirected along the Flex 503. The sampling and/or redirection of signals can be accomplished as needed for LED indicators. The present invention can be used to sample data signals from any kind of hardware connection.

Referring now to FIG. 6A, a perspective view pictorial diagram illustrating the flex circuit carrying the signal tap is depicted in accordance with the present invention. The flex 601 is held between the snap fit halves 603 and 604 of the connector 600. The flex is attached to the connector pins during assembly and a relief in the side of the connector 600 allows for the escape of the flex circuit 601. The flex circuit would be routed to a location on the drive FRU that would permit visibility of the LED indicators 602.

Figure 6B:
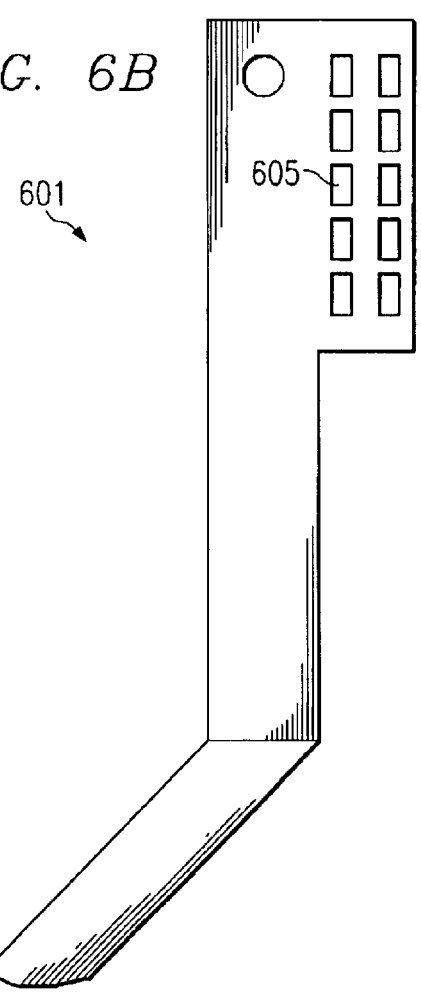
FIG. 6B depicts a schematic diagram illustrating the flex circuit in accordance with the present invention.

In reference to FIG. 6B, a schematic diagram illustrating the flex circuit 601 is depicted in accordance with the present invention. Flex circuit 601 contains several openings 605 through which pins from connector 600 can pass and establish a connection between connector 600 and flex 601. The flex 601 can be connected to the pins by several methods, such as, for example, soldering, wire trap, or unidirectional locking tine.

Figure 7:
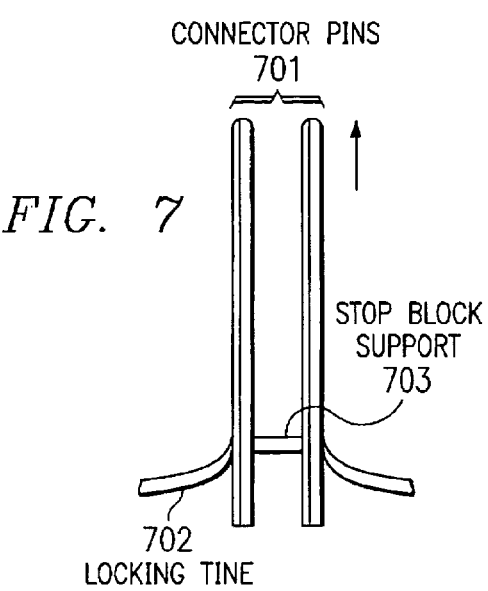
FIG. 7 depicts a schematic diagram illustrating a unidirectional locking tine in accordance with the present invention.

Referring to FIG. 7, a schematic diagram illustrating a unidirectional locking tine is depicted in accordance with the present invention. The locking tines 702 are located in the opening 605 on the flex 601. The connector pins 701 are pushed through openings 605 in the direction indicated by the arrow. The locking tine 702 applies enough pressure against pin 701 to remove any gas barrier between the tine 702 and pin 701 that might interfere with the conduction of an electrical current. The shape of the tine 702 and the pressure exerted by it allow the pin 701 to move only in the direction of insertion, indicated by the arrow. The stop block support 703 counters the pressure exerted by the tines 702 and maintains the proper parallel alignment between connector pins 701.

Figure 8:
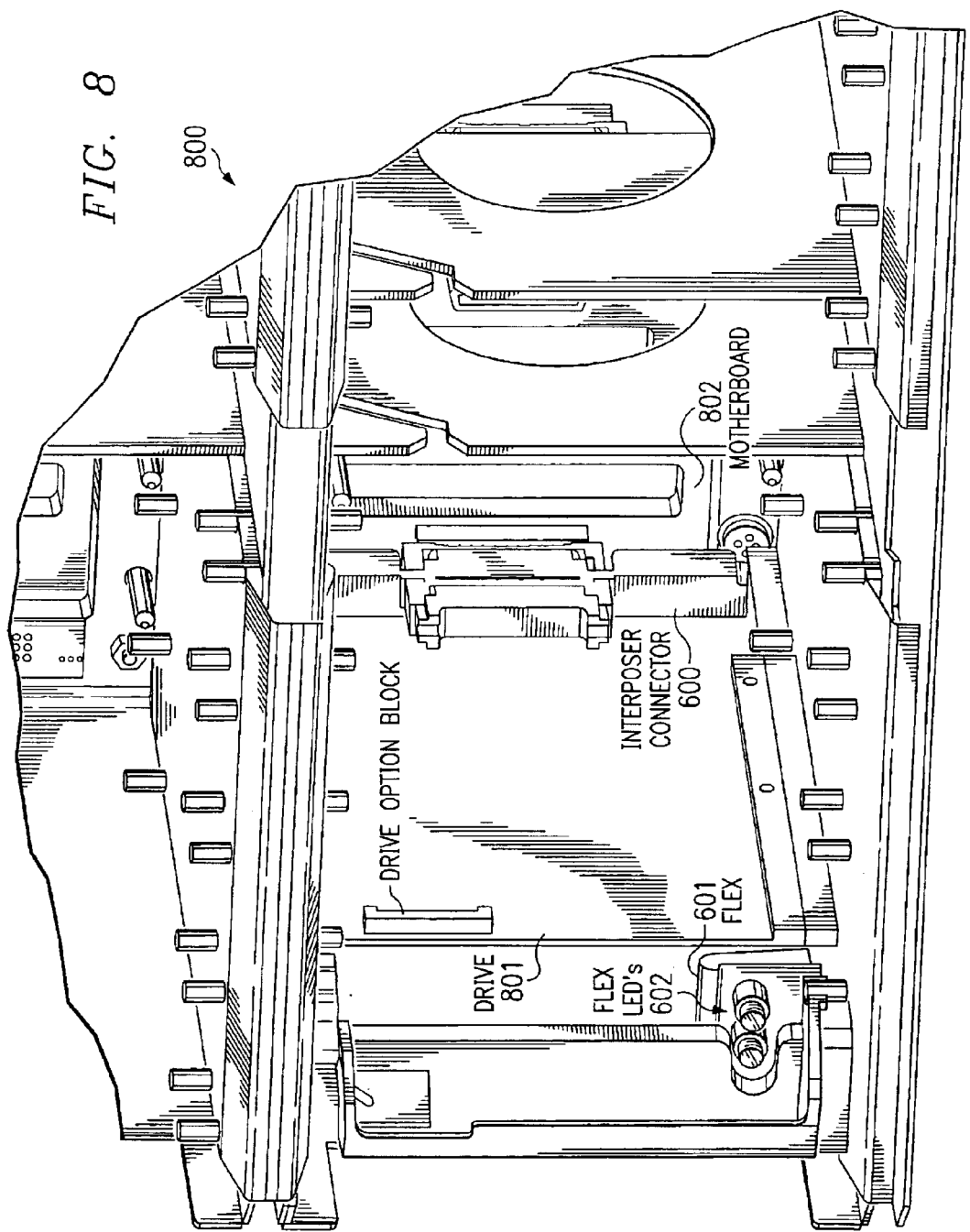
FIG. 8 depicts a perspective view pictorial diagram illustrating a drive module with interposer flex circuit inserted in the motherboard, in accordance with the present invention.

Referring to FIG. 8, a perspective view pictorial diagram illustrating a drive module with interposer flex circuit inserted in the motherboard is depicted in accordance with the present invention. The drive 801 is installed in computer chassis 800. The flex circuit 601 runs from the interposer connector 600, under the drive 801, to the LEDs 602. By placing the LEDs 602 on the FRU, active components are removed from the motherboard 802 (or backplane), improving reliability and avoiding a servicing issue when an LED stops working. Thus, if an LED 602 fails, it can be serviced without having to remove motherboard 802 and interrupt the availability of the machine.

Data sampling has several applications including, for example, detection of fault signals, LED/status, idle signals, error checking, or introduction of a signal analyzer.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for sampling data signals between electronic components, comprising:

connecting the electronic components by using a feed-through connector wherein the feed-through connector has connecting pins;

attaching one end of a flexible circuit to the connecting pins of the feed-through connector; and attaching an opposite end of the flexible circuit to a display.

2. The method according to claim 1, wherein the flexible circuit is attached to the connector pins by means of soldering.

3. The method according to claim 1, wherein the flexible circuit is attached to the connector by a unidirectional locking tine.

4. The method according to claim 1, wherein the flexible circuit is attached to the connector by a wire trap.

5. The method according to claim 1, wherein the display is a light emitting diode (LED).

6. The method according to claim 1, wherein the display constitutes a field replaceable unit (FRU).

7. The method according to claim 1, wherein the data sampling can be used for detection of fault signals, status, idle signals, error checking, and introduction of a signal analyzer.

8. The method of claim 1, wherein connecting the components using a feed-through connector includes:

directly connecting a first electronic component to a first end of the straight feed-through connector; and directly connector a second electronic component to a second end of the feed-through connector, and wherein the flexible circuit is directly coupled to the connecting pins of the feed-through connector.

9. The method of claim 8, wherein the first electronic component is a storage device and the second electronic component is a circuit board.

* * * * *